United States Patent [19]

Reybrouck

[11] Patent Number: 5,682,980
[45] Date of Patent: Nov. 4, 1997

[54] ACTIVE SUSPENSION SYSTEM

[75] Inventor: Koenraad Reybrouck, Brussels, Belgium

[73] Assignee: Monroe Auto Equipment Company, Monroe, Mich.

[21] Appl. No.: 595,949

[22] Filed: Feb. 6, 1996

[51] Int. Cl.[6] .................................................. B60G 11/26
[52] U.S. Cl. ........................................... 280/714; 280/707
[58] Field of Search ............................. 280/707, 714, 280/708, 709; 267/64.18, 64.22, 64.12, 64.28; 188/299; 364/424.05

[56] References Cited

U.S. PATENT DOCUMENTS

| | | | |
|---|---|---|---|
| 4,747,615 | 5/1988 | Yamamoto | 280/707 |
| 4,770,438 | 9/1988 | Sugasawa et al. | 280/707 |
| 4,809,179 | 2/1989 | Klinger et al. | 364/424.05 |
| 4,825,370 | 4/1989 | Kurosawa | 364/424.05 |
| 4,881,172 | 11/1989 | Miller | 364/424.05 |
| 4,907,154 | 3/1990 | Yasuda et al. | 364/424.05 |
| 4,936,423 | 6/1990 | Karnopp | 280/714 |
| 4,967,360 | 10/1990 | Fukunaga et al. | 364/424.05 |
| 4,970,645 | 11/1990 | Adachi et al. | 364/424.05 |
| 4,975,849 | 12/1990 | Ema | 364/424.05 |
| 5,082,308 | 1/1992 | Jones | 280/707 |
| 5,097,419 | 3/1992 | Lizell | 364/424.05 |
| 5,102,161 | 4/1992 | Williams | 280/707 |
| 5,219,152 | 6/1993 | Derrien et al. | 280/714 |
| 5,372,378 | 12/1994 | Seufert | 280/707 |

*Primary Examiner*—Kenneth R. Rice
*Attorney, Agent, or Firm*—Harness, Dickey & Pierce

[57] ABSTRACT

In accordance with the teachings of the present invention, a hydraulic actuator is described which is operable to generate forces. The hydraulic actuator includes a pressure cylinder as well as a piston disposed within a pressure cylinder and being operable to divide the pressure cylinder into first and second portions. The hydraulic actuator also includes a piston rod mechanically communicating with the piston and being operable to impart movement to the piston. Finally, the hydraulic actuator includes variable restriction valves for controlling the pressure on both sides of the piston substantially independent of the velocity of the piston within the pressure cylinder.

43 Claims, 3 Drawing Sheets

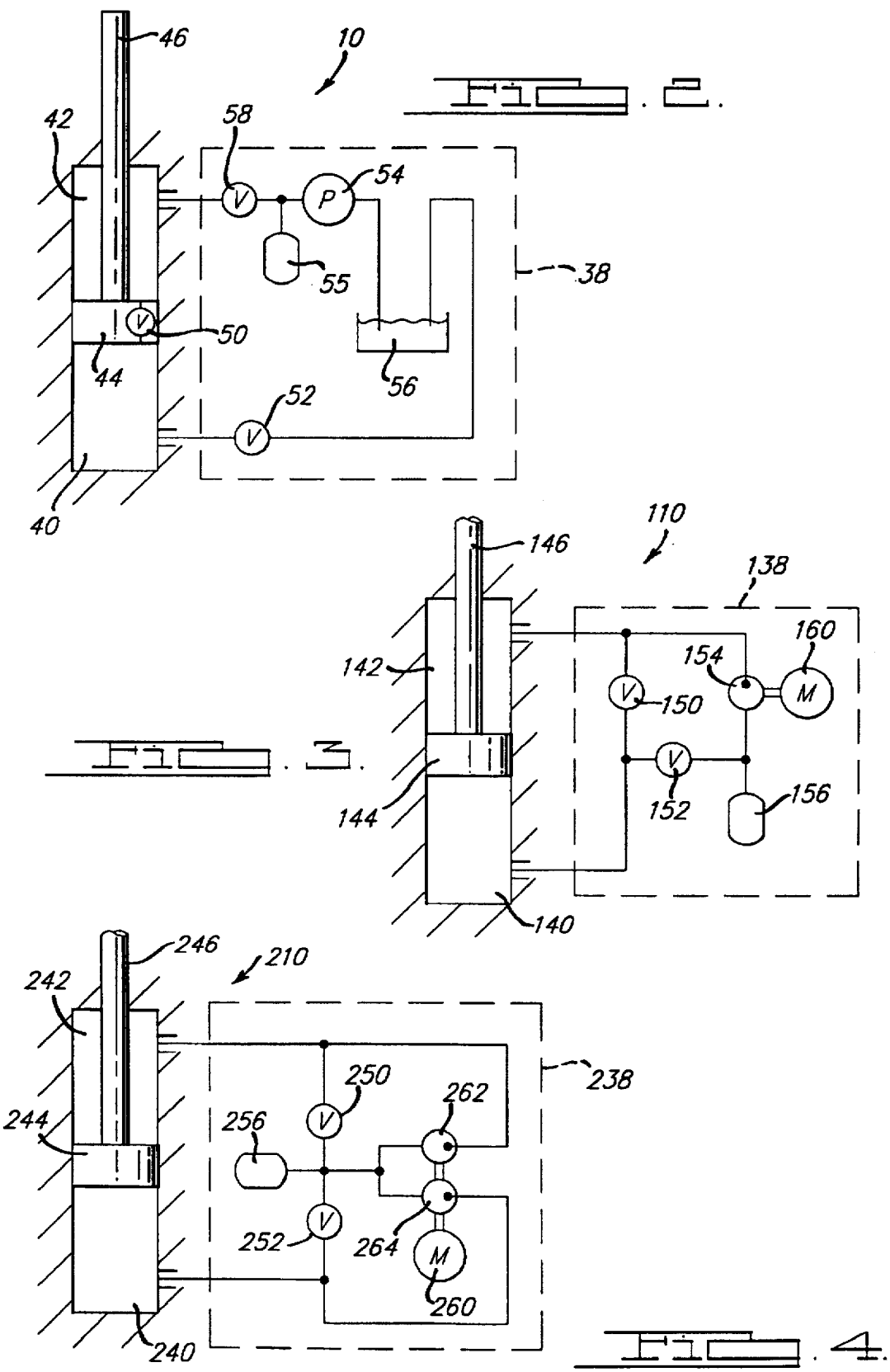

ACTIVE SUSPENSION SYSTEM

BACKGROUND OF THE INVENTION

1. Field of the Invention

This invention relates to a suspension system for automotive vehicles, and more particularly to an active suspension system.

2. Description of Related Art

Suspension systems are provided to filter or "isolate" the vehicle body from vertical road surface irregularities as well as to control body and wheel motion. In addition, suspension systems are also used to maintain an average vehicle attitude to promote improved platform stability during maneuvering. The classic passive suspension system includes a spring and a damping device in parallel which are located between the sprung mass (vehicle body) and the unsprung mass (wheel and axles).

Hydraulic actuators, such as shock absorbers and/or struts, are used in conjunction with conventional passive suspension systems to absorb unwanted vibration which occurs during driving. To absorb this unwanted vibration, hydraulic actuators include a piston located within the pressure cylinder of the actuator which is connected to the body of the automobile through a piston rod. Because the piston is able to restrict the flow of damping fluid within the working chamber of the hydraulic actuator when the actuator is displaced, the actuator is able to produce a damping force which counteracts the vibration of of the suspension. The greater the degree to which the flow of damping fluid within the working chamber is restricted by the piston, the greater the damping forces which are generated by the actuator.

In recent years, substantial interest has grown in automotive vehicle suspension systems which can offer improved comfort and road holding over the performance offered by conventional passive suspension systems. In general, such improvements are achieved by utilization of an "intelligent" suspension system capable of electronically controlling the suspension forces generated by hydraulic actuators.

Different levels in achieving the ideal "intelligent" suspension system, called "a full active suspension", are possible. Sometimes only dynamic forces acting against the movement of the piston in the actuator, damping can be generated an controlled. Sometimes static or slowly changing push-out forces, independent of the velocity of the piston in the actuator, can be added to the damping forces, called slow leveling. The most elaborate systems, full active suspensions, can generate variable forces, as well in rebound as in compression of the actuator, regardless of the position and movement of the piston in the actuator. It would be desirable to find simply a system which comes as close as possible to the full active suspension. In addition, in the event that the hydraulic system should fail, it would be desirable to have the hydraulic actuator still function in a fail-safe mode.

SUMMARY OF THE INVENTION

In accordance with the teachings of the present invention, a hydraulic actuator is disclosed which is operable to generate forces. The hydraulic actuator includes a pressure cylinder as well as a piston disposed within a pressure cylinder and being operable to divide the pressure cylinder into first and second portions. The hydraulic actuator also includes a piston rod mechanically communicating with the piston and being operable to impart movement to the piston. Finally, the hydraulic actuator includes means for controlling the pressures at both sides of the piston substantially independent of the velocity of the piston within the pressure cylinder.

An advantage of the present invention is to provide a hydraulic actuator which is able to be used in an active suspension system which provides for variable damping and leveling.

Another object of the present invention is to provide a hydraulic actuator in which the damping forces generated by the hydraulic actuator are substantially independent of the position and velocity of the piston within the pressure cylinder.

It is a further object of the present invention to provide a hydraulic actuator which can be used in an active suspension system. In this regard, it is a further object of the present invention to provide a hydraulic actuator which can be used with a relatively low pressure hydraulic system.

Another object of the invention is to provide a hydraulic actuator which enables a fail-safe suspension design in case of massive hydraulic pressure losses.

Another object of the invention is to provide a hydraulic actuator which is relatively simple and relatively inexpensive.

BRIEF DESCRIPTION OF THE DRAWINGS

Various advantages of the present invention will become apparent to one skilled in the art upon reading the following specification and by reference to the following drawings in which:

FIG. 2 is a diagrammatic illustration of the hydraulic actuator according to the first preferred embodiment of the present invention shown in FIG. 1;

FIG. 3 is a diagrammatic illustration of the hydraulic actuator according to the second preferred embodiment of the present invention shown in FIG. 1;

FIG. 4 is a diagrammatic illustration of the hydraulic actuator according to the third preferred embodiment of the present invention shown in FIG. 1;

DESCRIPTION OF THE PREFERRED EMBODIMENTS

Figure 1:
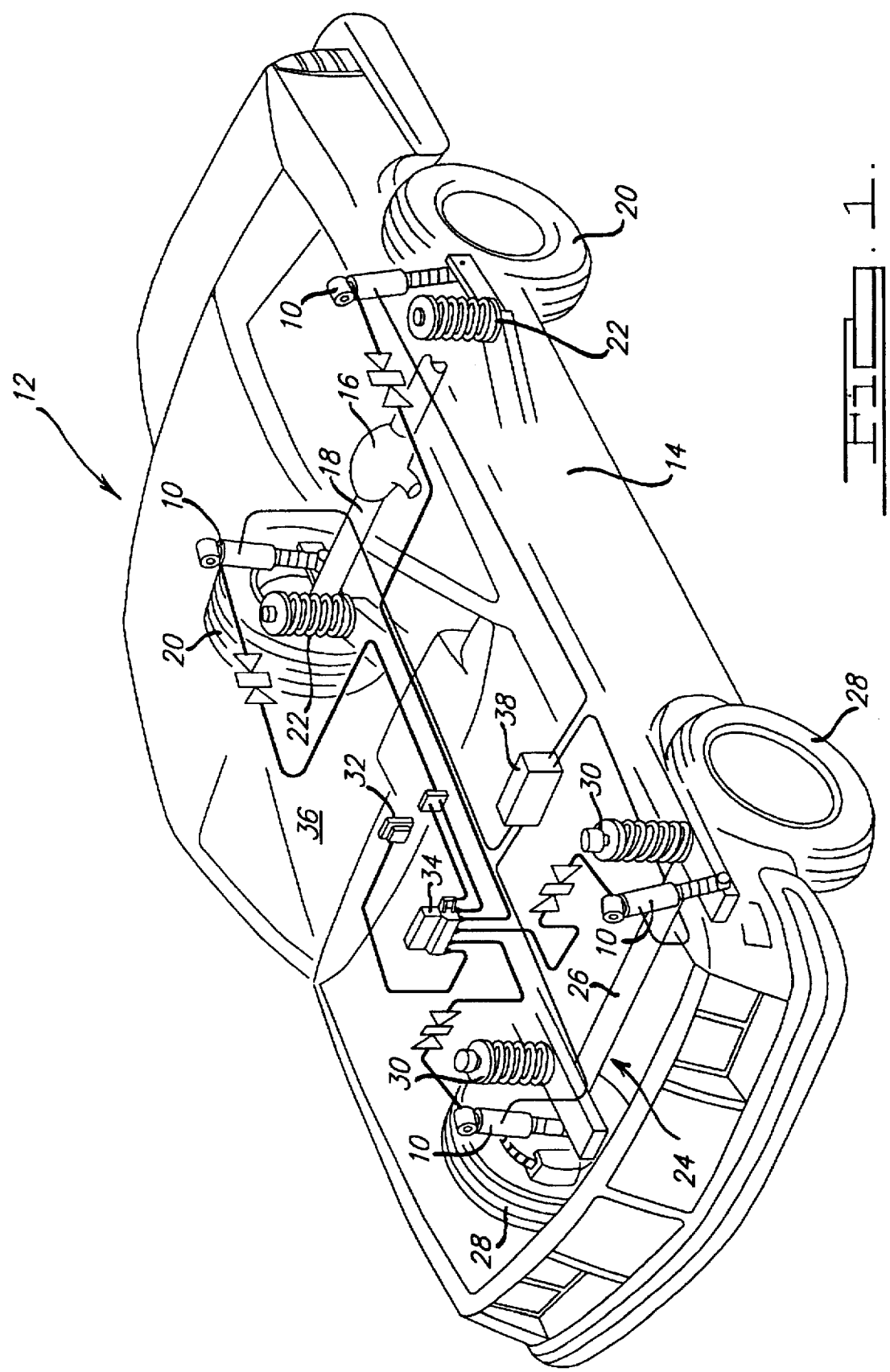
FIG. 1 is a diagrammatic illustration of the hydraulic actuator according to the teachings of the preferred embodiment of the present invention shown in operative association with a conventional automobile.

Referring to FIG. 1, a plurality of hydraulic actuators 10 in accordance with the teachings of the preferred embodiment of the present invention is shown. The hydraulic actuators 10 are depicted in operative association with a conventional automobile 12 having a vehicle body 14. The automobile 12 includes a rear suspension 16 having a transversely extending rear axle assembly 18 adapted to support the rear wheels 20. The rear axle assembly 18 is operably connected to the automobile 12 by means of a pair of hydraulic actuators 10 as well as by helical coil springs 22. Similarly, the automobile 12 has a front suspension system 24 including a transversely extending front axle assembly 26 adapted to support the front wheels 28. The front axle assembly 26 is connected to the automobile 12 by means of a second pair of hydraulic actuators 10 and by a second pair of helical coil springs 30. While the automobile 12 has been depicted as a passenger car, the hydraulic actuators 10 may be used with other types of motor vehicles as well. Furthermore, the structural association of the front and rear axle assemblies are exemplary in nature and are not intended to limit the scope of the present invention.

To allow the forces generated by the hydraulic actuators 10 to be controlled, a mode select switch 32 and an electronic control module 34 are provided. The mode select switch 32 is located within the passenger compartment 36 of the automobile 12 and is accessible by the occupants of the automobile 12. The mode select switch 32 is used for selecting the damping characteristics which the hydraulic actuators 10 are to provide as well as to adjust leveling. It will be appreciated, however, that the mode select switch 32 is optional.

The electronic control module 34 receives output from the mode select switch 32 as well as various sensors which are used for generating control signals for selectively controlling the forces generated by the hydraulic actuators 10. In fluid communication with each of the hydraulic actuators 10 is a closed-loop high pressure hydraulic system 38 which includes a pump 54, an accumulator 55 and a fluid reservoir 56 as more shown in FIG. 2 and fully discussed below.

Referring now to FIG. 2, the hydraulic actuator 10 comprises an elongated tubular pressure cylinder 40 defining a damping fluid-containing working chamber 42. Disposed within the working chamber is a reciprocal piston 44 which is operable to divide the working chamber 42 into an upper portion and a lower portion. The piston 44 is secured at one end to an axial extending piston rod 46.

To provide means for controlling the pressure on each side of the piston 44 substantially independent of the velocity of the piston 44, the hydraulic actuator 10 includes a first variable restriction valve 50 as well as a second variable restriction valve 52. The first variable restriction valve 50 can be located within the piston 44 and is operable to at least partially control the flow of damping fluid between the upper portion of the working chamber 42 and the lower portion of the working chamber 42. The first variable restriction valve 50 may be a one-way valve with low flow restriction during compression of the hydraulic actuator 10, as well as a bleed and a controlled blow-off during rebound of the hydraulic actuator 10. However, other suitable valves may be used. The second variable restriction valve 52 is operable to vary the flow of damping fluid between the lower portion of the working chamber 40 and the oil reservoir 56. By controlling the flow of damping fluid through the first variable restriction valve 50 and the second variable restriction valve 52, the pressure at both sides of the piston 44 may be controlled.

Both the first variable restriction valve 50 and the second variable restriction valve 52 electrically communicate with, and are controlled by, the electronic control module 34. As will be more fully described below, the electronic control module 34 controls the operation of the first and second variable restriction valves 50 and 52 such that the damping force generated by the hydraulic actuator 10 are substantially independent of the velocity of the piston 44 within the pressure cylinder 38. Accordingly, the electronic control module 34 can control the force generated by the hydraulic actuator to provide not only the proper amount of damping forces but also the active forces so as to satisfy requirements regarding leveling.

As discussed above, the hydraulic actuator 10 fluidly communicates with the high pressure hydraulic system 38. In this regard, the upper portion of the working chamber 42 receives a damping fluid from the reservoir 56 through the pump 54 as well as the accumulator 55 within the high pressure hydraulic system 38. The reservoir 56 is used to provide a first source of damping fluid to the hydraulic actuator 10 at a relatively low pressure, while the pump 54 is used to provide a second source of damping fluid to the hydraulic actuator 10 at a relatively high pressure. The flow of damping fluid into the upper portion of the working chamber 42 is controlled by a third variable restriction valve 58. The third variable restriction valve 58 is used to provide a relatively constant pressure within the upper portion of the working chamber 42 during movement of the piston 44. It will be appreciated, however, that the third variable restriction valve 58 may in fact be a fixed restriction so the desired leveling and damping characteristics are achieved by varying the first and second variable restriction valves 50 and 52.

The method of the present invention will now be described. After the hydraulic actuator 10 is installed in the manner as shown in FIG. 1, damping fluid is delivered to the upper portion of the working chamber 42 from the oil reservoir 56 through the pump 54 and the third variable restriction valve 58 (if present). The flow of damping fluid within the hydraulic actuator 10 is then regulated by the first variable restriction valve 50, which can be disposed within the piston 44, as well as by the second variable restriction valve 52 which fluidly communicates with the lower portion of the working chamber 42. Because the flow of damping fluid through the hydraulic actuator 10 is controlled by the first and second variable restriction valves 50 and 52, the resulting pressures at both sides of the piston 44 are therefore substantially independent of the velocity of the piston 44. Accordingly, the electronic control module 34 is therefore able to change the damping forces generated by the hydraulic actuator 10 (i.e., by changing the velocity of the piston 44 by varying the flow through the first variable restriction valve 50) as well as to change the position of the piston 44 within the pressure cylinder 40 (by adjusting the flow through the first and second variable restriction valves 50 and 52) so as to provide for vehicle leveling.

The second preferred embodiment of the present invention will now be described with reference to FIG. 3. The components shown in FIG. 3 which operate in a similar fashion to that which is described with respect to the first preferred embodiment shown in FIG. 2 will be identified by similar reference numerals which have been incremented by 100. In this regard, the hydraulic actuator 110 comprises a pressure cylinder 140 defining a working chamber 142 having a piston 144 disposed therein. The piston 144 is able to divide the working chamber 142 into an upper portion as well as a lower portion. The piston 144 is secured at one end to a piston rod 146 which is able to impart movement to the piston 144. Hydraulic system 138 includes a pump 154, an accumulator 156 and a motor 160

To provide a first source of damping fluid, the hydraulic actuator 110 further includes the accumulator 156. The accumulator 156 is operable to store damping fluid at a pressure which determines the static pressure of the hydraulic actuator 110 and therefore the static push-out force of the hydraulic actuator 110. As will be appreciated by those skilled in the art, the static pressure can be adjusted by an external or internal system to provide slow load leveling. To provide a second source of damping fluid at a second pressure, the hydraulic actuator 110 further includes the pump 154. The pump 154 receives damping fluid from the accumulator 156 and is able to deliver the fluid at a relatively higher pressure to either the upper or lower portion of the working chamber 142, depending on the operating of a pair of restriction valves 150 and 152. The pump 154 is operated at a constant speed by the motor 160 and therefore is able to generate a relatively uniform flow of damping fluid.

To provide means for controlling the flow of damping fluid from the pump 154 to the accumulator 156, the hydraulic actuator 110 further includes the first variable restriction valve 150 and the second variable restriction valve 152. One side of the first variable restriction valve 150 fluidly communicates with the upper portion of the working chamber 142 as well as the output of the pump 154. The other side of the first variable restriction valve 150 fluidly communicates with the lower portion of the working chamber 142 as well as one side of the second variable restriction valve 152. The second side of the second variable restriction valve 152 fluidly communicates with the input of the pump 154 as well as the accumulator 156.

When it is desirable to move the piston 144 downward by increasing the pressure within the upper portion of the working chamber 142, the first variable restriction valve 150 is closed while the second variable restriction valve 152 is open. The pump 154 is therefore able to deliver damping fluid to the upper portion of the working chamber 142. At the same time, damping fluid in the lower portion of the working chamber 142 is able to flow into the accumulator 156 through the second variable restriction valve 152. When it is desirable to move the piston 144 in an upward direction, the first variable restriction valve 150 is opened while the second variable restriction valve 152 is closed. This causes the pressure of the damping fluid in both the upper and lower portions of the working chamber 142 to become substantially the same. Since the surface area of the piston 144 upon which damping fluid in the lower portion of the working chamber 142 acts is larger than the surface area of the piston 144 upon which damping fluid in the upper portion of the working chamber 142 acts, the piston 144 is displaced upwardly.

The third preferred embodiment of the present invention will now be described with reference to FIG. 4. The components shown in FIG. 4 which operate in a similar fashion to the corresponding components shown in FIG. 3 will be identified by similar reference numerals incremented by 100. The hydraulic actuator 210 shown in FIG. 4 comprises an elongated pressure cylinder 240 which defines a fluid containing working chamber 242. Disposed within the working chamber 242 is a reciprocal piston 244 which is operable to divide the working chamber 242 into an upper portion as well as a lower portion. The reciprocal piston 244 is secured at one end to an axial extending piston rod 246 which is able to impart movement to the piston 244. Hydraulic system 238 includes an accumulator 256, a motor 160, a pump 262 and a pump 264.

To provide a first source of damping fluid to the upper and lower portions of the working chamber 242, the hydraulic actuator 210 further includes the accumulator 256. The accumulator 256 is used to store damping fluid which may be delivered to the upper and lower portions of the working chamber 242. In this regard, the accumulator 256 fluidly communicates with the upper portion of the working chamber 242 through a first variable restriction valve 250, while the accumulator 256 fluidly communicates with the lower portion of the working chamber 242 through a second variable restriction valve 252. The first and second variable restrictions valves 250 and 252 may be bi-directional valves having a controllable blow-off pressure. However, other suitable valves may be used.

To provide a second source of damping fluid to the first and second portions of the working chamber 242, the hydraulic actuator 210 further includes the first pump 262 and the second pump 264. The first pump 262 is able to receive fluid from the accumulator 256 and deliver the fluid to the upper portion of the working chamber 242. In a similar fashion, the second pump 264 is able to receive damping fluid from the accumulator 256 and deliver the damping fluid to the lower portion of the working chamber 242. The first and second pumps 262 and 264 are driven by the motor 260 at a constant speed so that the first and second pumps 262 and 264 provide a relatively uniform flow of damping fluid to the upper and lower portions of the working chamber 242.

The operation of the hydraulic actuator 210 shown in FIG. 4 will now be described. When the hydraulic actuator 210 is at a static position, the first and second variable restriction valves 250 and 252 are open therefore causing damping fluid flowing from the output of the first pump 262 to flow back to the first pump 262 through the first variable restriction valve 250. In a similar fashion, fluid delivered by the output of the second pump 264 is delivered back to the second pump 264 through the second variable restriction valve 252. When it is desired to increase the pressure of damping fluid in the upper portion of the working chamber 242, the first variable restriction valve 250 is closed thereby causing damping fluid received by the first pump 262 from the accumulator 256 to be delivered to the upper portion of the working chamber 242. At the same time, the second variable restriction valve 252 is open thereby allowing damping fluid in the lower portion of the working chamber 242, as well as the damping fluid flowing through the second pump 264, to be delivered to the accumulator 256 as well as to the second pump 264.

When it is desired to increase the pressure of damping fluid in the lower portion of the working chamber 242, the first variable restriction valve 250 is opened while the second variable restriction valve 252 is closed. This causes the amount of damping fluid delivered by the second pump 264 to the lower portion of the working chamber 242 to increase while at the same time allowing damping fluid from the upper portion of the working chamber 242 to be delivered to the accumulator 256 by the first variable restriction valve 250. Accordingly, the pressure of damping fluid in the lower portion of the working chamber 242 is able to increase while the pressure of the damping in the upper portion of the working chamber 242 is reduced.

Figure 5:
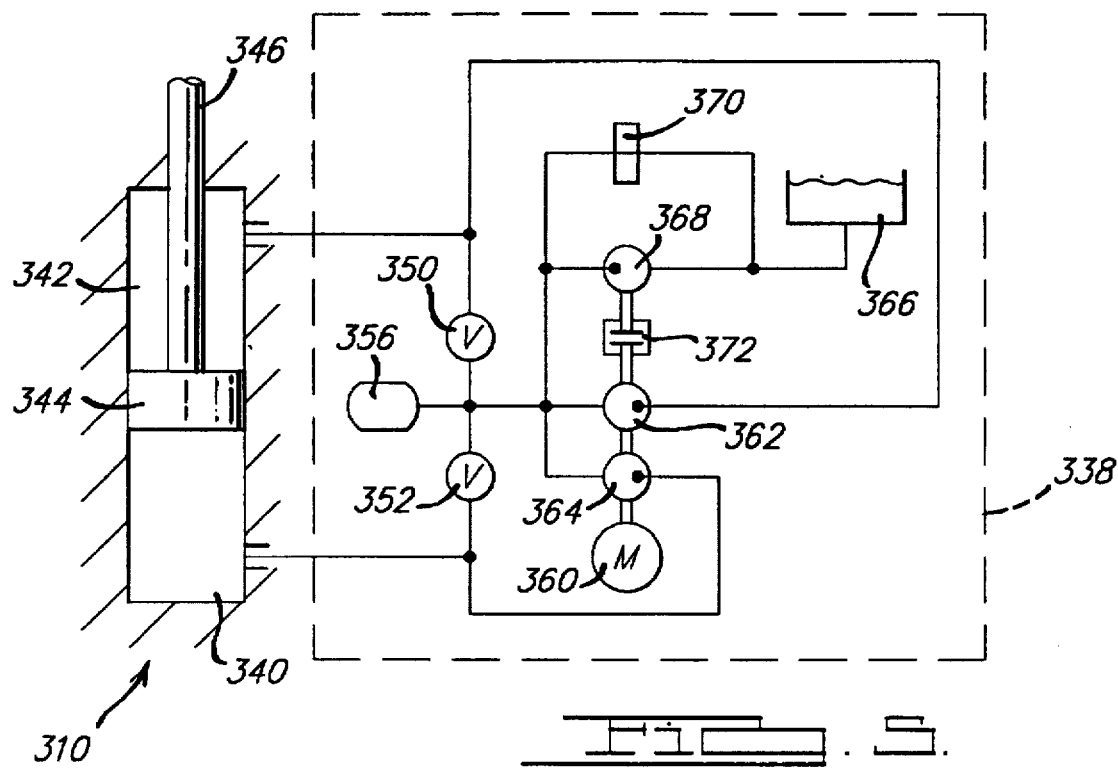
FIG. 5 is a diagrammatic illustration of the hydraulic actuator shown in FIG. 4 using a clutch to control the pressure within the accumulator.

The hydraulic actuator 210 shown in FIG. 4 can be modified to provide means for controlling independently the static pressure of the damping fluid within the actuator. One such modification is shown in FIG. 5 in which components similar to the components shown in FIG. 4 are similarly labeled with the reference numerals incremented by 100. The hydraulic actuator 310 shown in FIG. 5 includes a pressure cylinder 340 which defines a working chamber 342. A piston 344 is disposed within working chamber 342 and divides working chamber 342 into an upper portion and a lower portion. A piston rod 346 is secured at one end to piston 344. Hydraulic system 338 includes a first variable restriction valve 350, a second variable restriction valve 352, an accumulator 356, a motor 360, a pump 362, a pump 364 and a reservoir 366. The reservoir 366 provides a source of damping fluid which is able to be delivered to the accumulator 356 so as to increase the pressure of the damping fluid in the accumulator 356. To provide means for controlling the flow of damping fluid from the reservoir 366 to the accumulator 356, the hydraulic actuator 310 further includes a third pump 368 as well as a bypass valve 370. The third pump 368 is operable to receive damping fluid from the reservoir 366 and deliver a pressurized flow of damping fluid to the accumulator 356. The flow of damping fluid to the accumulator 356 is regulated by the bypass valve 370 which is disposed in parallel with respect to the third pump 368 between the accumulator 356 and the reservoir 366.

When the bypass valve 370 is closed, damping fluid is delivered from the reservoir 366 to the accumulator 356 through the third pump 368. When the bypass valve 370 is open, damping fluid is able to flow from the output of the third pump 368 to the input of the third pump 368. Accordingly, the bypass valve 370 is able to control the delivery of fluid to and from the accumulator 356 and therefore the pressure within the accumulator 356. The third pump 368 is driven by the motor 360 through a controllable clutch 372. The controllable clutch 372 is used to control the speed of the third pump 368 and therefore the flow of damping fluid delivered by the third pump 368.

Figure 6:
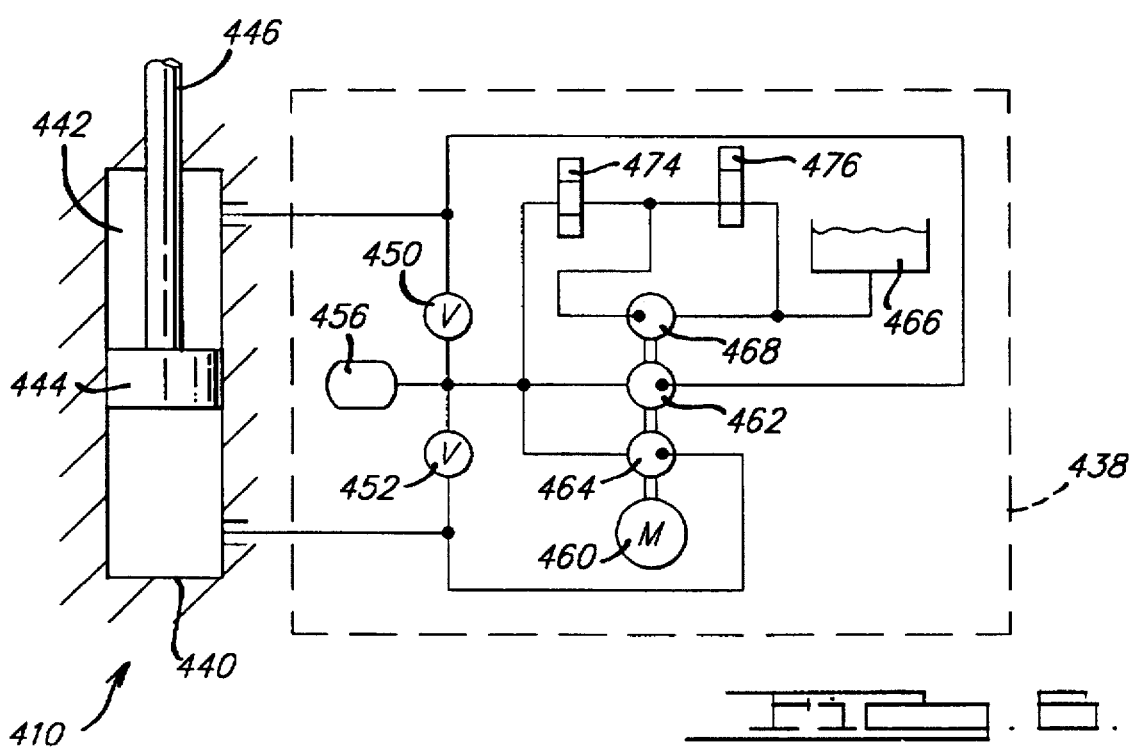
FIG. 6 is a diagrammatic illustration of the hydraulic actuator shown in FIG. 4 using two switchable valves for controlling the pressure within the accumulator.

The hydraulic actuator 310 shown in FIG. 5 can be modified to be driven from a motor directly without the need for a controllable clutch in the manner shown in FIG. 6. In this regard, the components in FIG. 6 which are similar to that shown in FIG. 5 are indicated by similar reference numerals which are incremented by 100. As shown, the hydraulic actuator 410 includes a pressure cylinder 440 which defines a working chamber 442. A piston 444 is disposed within working chamber 442 and divides working chamber 442 into an upper portion and a lower portion. A piston rod 446 is secured at one end to piston 444. Hydraulic system 438 includes a first variable restriction valve 450, a second variable restriction valve 452, an accumulator 456, a motor 460, a pump 462, a pump 464, a reservoir 466, a pump 468, a first switchable valve 474 and a second switchable valve 476. The first switchable valve 474 controls the flow of damping fluid from the output of the third pump 468 to the accumulator 456, while the second switchable valve 476 controls the flow from the output of the third pump 468 to the input of the third pump 468.

When the pressure of damping fluid inside the accumulator 456 is to remain static, the first switchable valve 474 is closed while the second switchable valve 476 is open. This allows damping fluid from the output of the third pump 468 to be delivered to the input of the third pump 468. When it is desired to increase the pressure of the damping fluid within the accumulator 456, the first switchable valve 474 is opened while the second switchable valve 476 is closed thereby causing damping fluid from the output of the third pump 468 to be delivered to the accumulator 456. This causes the pressure within the accumulator 456 to increase. When it is desired to reduce the pressure within the accumulator 456, the first switchable valve 474 is opened together with the second switchable valve 476, thereby causing damping fluid in the accumulator 456 to flow into the reservoir 466. Because the first and second switchable valves 474 and 476 are operable to regulate the flow of damping fluid into and out of the accumulator 456, the third pump 468 may be driven at a constant speed by the motor 460 thereby eliminating the need for a controllable clutch.

As evidenced from the foregoing, those skilled in the art will appreciate that the present invention is able to provide a hydraulic actuator which is able to be used in a suspension system to provide both variable damping and leveling. In addition, the hydraulic actuator is able to provide damping forces which are substantially independent from the position of the piston within the pressure cylinder. The hydraulic actuator allows a conventional spring to be mounted in parallel with the actuator without appreciable loss of performance of the suspension system. Since conventional springs may be used, only dynamic forces have to be generated by the pump thereby permitting only relatively low pressures to be used within the hydraulic system. This permits relatively standard components to be used in the piston valve and other components of the hydraulic actuator. However, with the embodiments shown in FIGS. 3–6, the different actuators must be connected to different pumps. These pumps can be combined to one or two central units (keeping the hydraulic circuits separated), but the pumps can also be integrated with different actuators.

It will also be noted that the hydraulic actuator of the present invention is operable to minimize the impact of a hydraulic system failure. In this regard, the hydraulic actuator can be used in parallel with a spring. In such an implementation, the failure of the hydraulic system will cause the hydraulic actuator to work as firm passive damper.

While it will be apparent that the preferred embodiment illustrated above is well calculated to fulfill the objects stated, it will be appreciated that the present invention is susceptible to modification, variation, and change without departing from the scope of the invention. Accordingly, the invention is to be measured against the scope of the following claims.

What is claimed is:

1. A hydraulic actuator being operable to generate damping forces, said hydraulic actuator being in fluid communication with a source of fluid, comprising:

a pressure cylinder;

a piston disposed in said pressure cylinder being operable to divide said pressure cylinder into first and second portions, said piston having first and second sides;

a piston rod mechanically communicating with said piston, said piston rod being operable to impart movement to said piston; and means for controlling the pressure on each side of said piston substantially independent from the velocity of said piston within said pressure cylinder by controlling the flow of damping fluid between said source and said hydraulic actuator, said means for controlling the pressure on each side of said piston being operable to control the position of said piston in said pressure cylinder.

2. The hydraulic actuator of claim 1, wherein the pressure of damping fluid in said first portion of said pressure cylinder remains substantially constant.

3. The hydraulic actuator of claim 1 wherein, said means for controlling the pressure on each side of said piston being further operable to control the damping forces generated by said hydraulic actuator.

4. The hydraulic actuator of claim 1, wherein said means for controlling the pressure on each side of said piston includes a first variable restriction valve being operable to at least partially control the flow of damping fluid between said first portion of said pressure cylinder and said second portion of said pressure cylinder.

5. The hydraulic actuator of claim 4, wherein said first variable restriction valve is disposed within said piston.

6. The hydraulic actuator of claim 4, wherein said source of damping fluid includes a reservoir of damping fluid for said hydraulic actuator, said means for controlling the pressure on each side of said piston includes a second variable restriction valve being operable to control the flow of damping fluid between said second portion of said pressure cylinder and said reservoir of damping fluid.

7. The hydraulic actuator of claim 6, wherein said source of pressurized fluid further includes a pump fluidly communicating with said first portion of said pressure cylinder and said reservoir of damping fluid.

8. The hydraulic actuator of claim 6, wherein said means for controlling the pressure on each side of said piston further includes a third variable restriction valve being operable to control the flow of damping fluid between said reservoir of damping fluid and said first portion of said pressure cylinder.

9. A hydraulic actuator being operable to generate damping forces comprising:
   a pressure cylinder;
   a piston disposed in said pressure cylinder being operable to divide said pressure cylinder into first and second portions: said piston having first and second sides;
   a reservoir operable to store damping fluid, said reservoir fluidly communicating with said first and second portions of said pressure cylinder;
   means for pressurizing damping fluid delivered from said reservoir to said first portion of said pressure cylinder; and
   a plurality of variable restriction valves operable to control the pressure on each side of said piston and therefore the position of said piston within said hydraulic actuator;
   whereby said pressure on each side of said piston is substantially independent from the velocity of said piston within said pressure cylinder.

10. The hydraulic actuator of claim 9 wherein, said plurality of variable restriction valves are further operable to control the damping forces generated by said hydraulic actuator.

11. The hydraulic actuator of claim 9, wherein said plurality of variable restriction valves include a first variable restriction valve being operable to at least partially control the flow of damping fluid between said first portion of said pressure cylinder and said second portion of said pressure cylinder.

12. The hydraulic actuator of claim 11, wherein said plurality of variable restriction valves includes a second variable restriction valve being operable to control the flow of damping fluid from said second portion of said pressure cylinder to said reservoir.

13. The hydraulic actuator of claim 12, wherein said plurality of variable restriction valves includes a third variable restriction valve being operable to control the flow of damping fluid between said reservoir to said first portion of said pressure cylinder.

14. The hydraulic actuator of claim 9, wherein the pressure of damping fluid in said first portion of said pressure cylinder remains substantially constant.

15. A method for controlling the force generated by a hydraulic actuator having a working chamber with a piston disposed therein, said piston being operable to divide said working chamber into first and second portions, said method comprising the steps of:
   delivering damping fluid to said first portion of said working chamber;
   regulating the flow of damping fluid through a first variable restriction valve fluidly communicating with said first portion of said working chamber;
   regulating the flow of damping fluid through a second variable restriction valve fluidly communicating with said second portion of said working chamber; and
   controlling the pressure in said first and second portions to control the position of said piston in said working chamber;
   whereby the pressure in said first and second portions is substantially independent from the velocity of the piston within said pressure cylinder.

16. The method of claim 15, wherein said step of delivering damping fluid to said first portion of said working chamber includes the step of delivering damping fluid from an accumulator to said first portion of said working chamber.

17. The method of claim 16, wherein said step of delivering damping fluid from said accumulator to said first portion of said working chamber includes the step of allowing damping fluid to flow between a third variable restriction valve and said accumulator.

18. The method of claim 15, further comprising the additional step of delivering pressurized damping fluid to said first portion of said working chamber.

19. The method of claim 15, comprising the additional step of controlling the flow of damping fluid through said first and second variable restriction valves so as to control the damping forces generated by said hydraulic actuator.

20. The method of claim 15, wherein said step of delivering damping fluid to said first portion of said working chamber includes the step of delivering damping fluid through at least one of said variable restriction valves.

21. A hydraulic actuator being operable to generate damping, forces comprising:
   a pressure cylinder;
   a piston disposed within said pressure cylinder being operable to divide said pressure cylinder into first and second portions, said piston having first and second sides;
   a first source of damping fluid being operable to provide damping fluid at a first pressure to said first and second portions of said pressure cylinder;
   a second source of damping fluid being operable to provide damping fluid at a second pressure to said first and second portions of said pressure cylinder; and
   means for controlling the flow of damping fluid between said second source of damping fluid and said first source of damping fluid thereby controlling the pressure on said first and second sides of said piston and the position of said piston in said pressure cylinder.

22. The hydraulic actuator of claim 21, wherein said first source of damping fluid comprises an accumulator.

23. The hydraulic actuator of claim 22, wherein said second source of damping fluid includes a first pump fluidly communicating with said first portion of said pressure cylinder.

24. The hydraulic actuator of claim 23, wherein said second source of damping fluid includes a second pump fluidly communicating with said second portion of said pressure cylinder.

25. The hydraulic actuator of claim 24, further comprising a motor operable to drive said first and second pumps at a substantially constant speed.

26. The hydraulic actuator of claim 21, further comprising means for controlling the pressure of damping fluid in said first source of damping fluid.

27. The hydraulic actuator of claim 26, wherein means for controlling the pressure of damping fluid in said first source of damping fluid comprises a reservoir and means for controlling the flow of damping fluid from said reservoir to said first source of damping fluid.

28. The hydraulic actuator of claim 27, wherein said means for controlling the flow of damping fluid from said reservoir to said first source of damping fluid includes:
   (a) a pump operable to deliver damping fluid from said reservoir to said first source of damping fluid; and (b) a valve being operable to control the flow of damping fluid between said second source of damping fluid and said reservoir.

29. The hydraulic actuator of claim 28, wherein, said means for controlling the flow of damping fluid from said reservoir to said first source of damping fluid further includes a clutch operable to control the speed of said pump.

30. The hydraulic actuator of claim 27, further comprising:
    (a) a pump operable to deliver damping fluid from said reservoir to said first source of damping fluid,
    (b) a first valve being operable to control the flow of damping fluid from said pump to said first source of damping fluid; and
    (c) a second valve being operable to control the flow of damping fluid from said pump to said reservoir.

31. A method for controlling the force generated by a hydraulic actuator having a working chamber and a piston disposed therein, said piston being operable to divide said working chamber into first and second portions, said method comprising the steps of:
    delivering damping fluid from a first source of damping fluid to said first and second portions of said working chamber;
    regulating the flow of damping fluid between said first portion of said working chamber and an accumulator by a first variable restriction valve;
    regulating the flow of damping fluid between said second portion of said working chamber and said accumulator by a second variable restriction valve; and
    controlling the pressure in said first and second portions to control the position of said piston in said working chamber.

32. The method of claim 31, wherein said hydraulic actuator further includes:
    a pump;
    a motor operable to drive said pump;
    a clutch disposed between said motor and said pump; and
    a reservoir of damping fluid in fluid communication with said pump;
    said method further including the additional step of delivering damping fluid from said reservoir to said accumulator through said pump.

33. The method of claim 32, wherein said step of delivering damping fluid from said reservoir to said accumulator includes the step of controlling the output of said pump by actuation of said clutch.

34. The method of claim 31, wherein said step of delivering damping fluid from a first source of damping fluid to said first and second portions of said working chamber further comprises the step of allowing damping fluid in said accumulator to be delivered to a first pump, said first pump being in fluid communication with said first portion of said working chamber.

35. The method of claim 34, wherein said step of delivering damping fluid from a first source of damping fluid to said first and second portions of said working chamber further comprises the step of allowing damping fluid in said accumulator to be delivered to a second pump, said second pump being in fluid communication with said second portion of said working chamber.

36. The method of claim 31, wherein said step of delivering damping fluid from a first source of damping fluid to said first and second portions of said working chamber includes the step of causing a plurality of pumps to provide a substantially uniform output of damping fluid.

37. The method of claim 31, wherein said hydraulic actuator further includes:
    a pump;
    a motor operable to drive said pump
    a reservoir of damping fluid in fluid communication with said pump;
    a first switchable valve fluidly communicating with said accumulator and said reservoir; and
    a second switchable valve fluidly communicating with said pump and said accumulator;
    said method comprising the additional step of controlling the pressure of damping fluid within said accumulator by controlling the operation of said first and second switchable valves.

38. A hydraulic actuator being operable to generate damping forces comprising:
    a pressure cylinder;
    a piston disposed within said pressure cylinder being operable to divide said pressure cylinder into first and second portions, said piston having first and second sides;
    a first source of damping fluid being operable to provide damping fluid at a first pressure to said first and second portions of said pressure cylinder;
    a second source of damping fluid being operable to provide damping fluid at a second pressure to said first and second portions of said pressure cylinder;
    a first adjustable restriction valve being operable to at least partially control the flow of damping fluid from said first portion of said pressure cylinder and said second source of damping fluid to said first source of damping fluid;
    a second adjustable restriction valve being operable to at least partially control the flow of damping fluid from said second portion of said pressure cylinder and said second source of damping fluid to said first source of damping fluid; and
    means for controlling the pressure on each side of said piston to control the position of said piston in said pressure cylinder.

39. The hydraulic actuator of claim 38, wherein said first source of damping fluid comprises a first pump being operable to receive damping fluid from said first source of damping fluid and deliver said damping fluid to said first portion of said pressure cylinder.

40. The hydraulic actuator of claim 39, wherein said second source of damping fluid further comprises a second pump being operable to deliver damping fluid from said first source of damping fluid to said second portion of said pressure cylinder.

41. The hydraulic actuator of claim 40, further comprising:
    a reservoir of damping fluid;
    a third pump for delivering damping fluid from said reservoir to said first source of the damping fluid; and
    means for controlling the flow of damping fluid from said reservoir to said first source of damping fluid.

42. The hydraulic actuator of claim 41, wherein said means for controlling the flow of damping fluid from said reservoir to said first source of damping fluid further includes a clutch operable to control the speed of said third pump.

43. The hydraulic actuator of claim 40, further comprising:
 (a) a reservoir of damping fluid,
 (b) a third pump operable to deliver damping fluid from said reservoir to said first source of damping fluid,
 (c) a first switchable valve being operable to control the flow of damping fluid from said third pump to said first source of damping fluid; and
 (d) a second switchable valve being operable to control the flow of damping fluid from said third pump to said reservoir.

* * * * *

UNITED STATES PATENT AND TRADEMARK OFFICE
CERTIFICATE OF CORRECTION

PATENT NO. : 5,682,980
DATED : November 4, 1997
INVENTOR(S) : Koenraad Reybrouck It is certified that error appears in the above-identified patent and that said Letters Patent is hereby corrected as shown below:

Col. 1, line 29, delete 2nd occurrence of "of"

Col. 1, line 44, delete "forces" and substitute -- forces, -- therefor

Col. 1, line 46, delete "an" and substitute --and-- therefor

Col. 3, line 28, "more shown in FIG. 2 and" should be --shown in FIG. 2 and more--

Col. 3, line 32, "chamber" should be --chamber 42--

Col. 3, line 61, delete "force" and substitute --forces-- therefor

Col. 4, line 56, delete "motor 160" and substitute --motor 160.-- therefor

Col. 5, line 65, delete "restrictions" and substitute --restriction-- therefor

Col. 9, line 15, claim 9, "portions:" should be --portions,--

Col. 10, line 25, claim 21, "damping," should be --damping-- therefor

Col. 12, line 7, claim 37, delete "pump" and substitute --pump;-- therefor

Signed and Sealed this

Nineteenth Day of May, 1998

Attest:

BRUCE LEHMAN

Attesting Officer

Commissioner of Patents and Trademarks